(No Model.) 5 Sheets—Sheet 2.
J. E. WALLER & E. MANVILLE.
CONDUIT SYSTEM FOR ELECTRIC RAILWAYS.
No. 469,828. Patented Mar. 1, 1892.
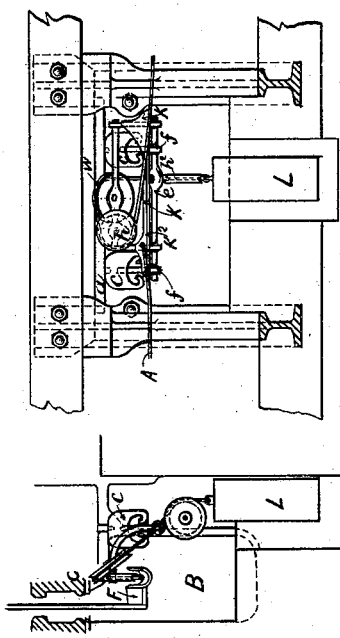
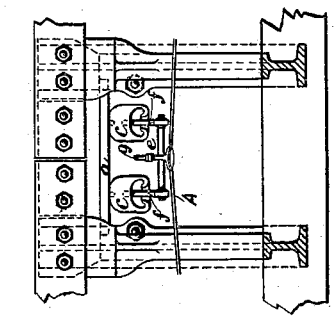
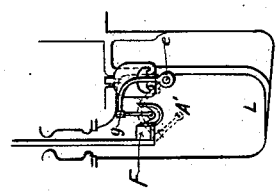
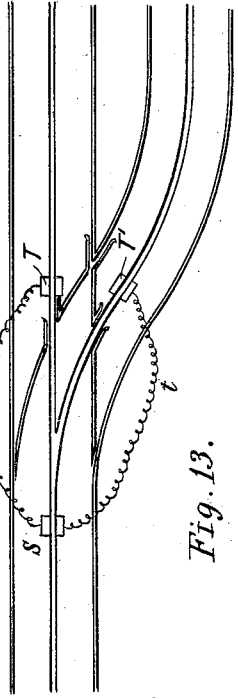
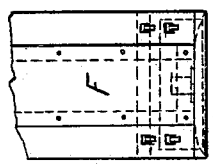
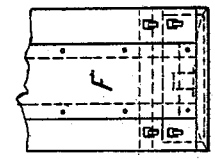
Witnesses:
Thomas King
E. L. Richards
Inventors:
John Edward Waller,
Edward Manville,
By Richards & ―
Attorneys.

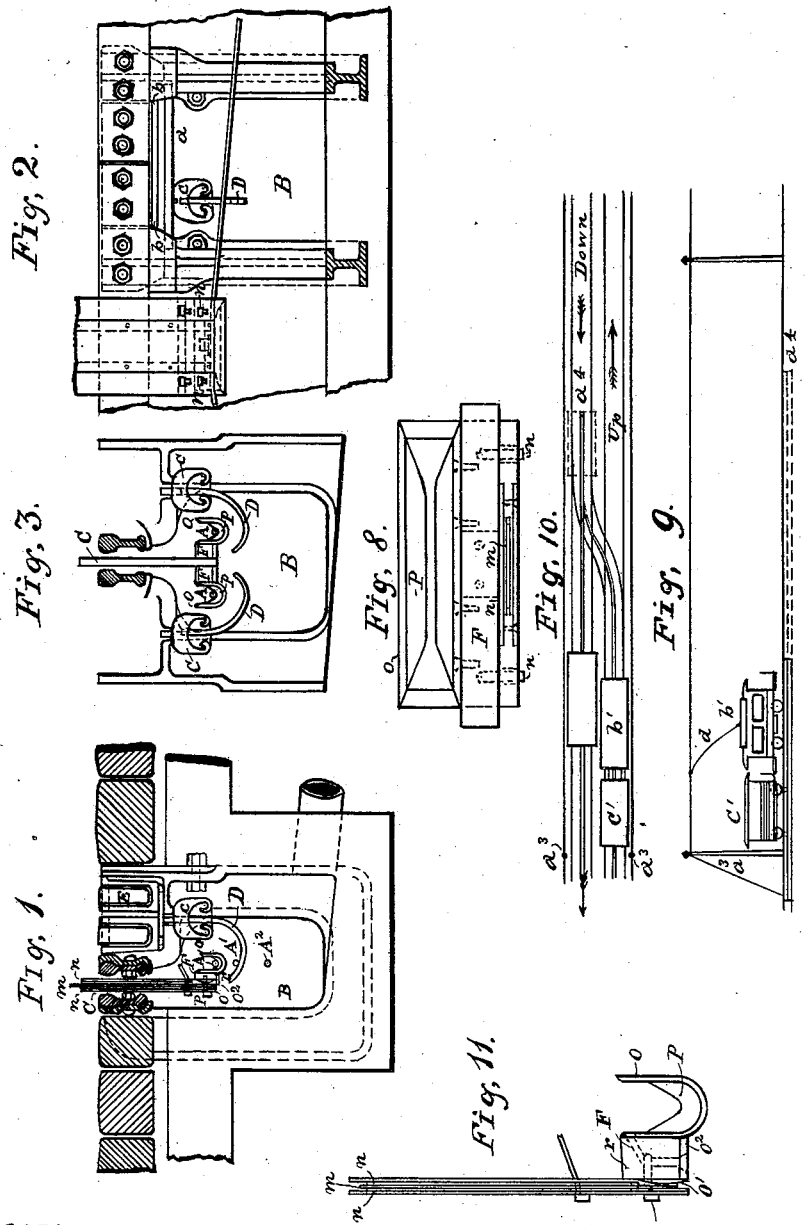

(No Model.) 5 Sheets—Sheet 3.
J. E. WALLER & E. MANVILLE.
CONDUIT SYSTEM FOR ELECTRIC RAILWAYS.
No. 469,828. Patented Mar. 1, 1892.
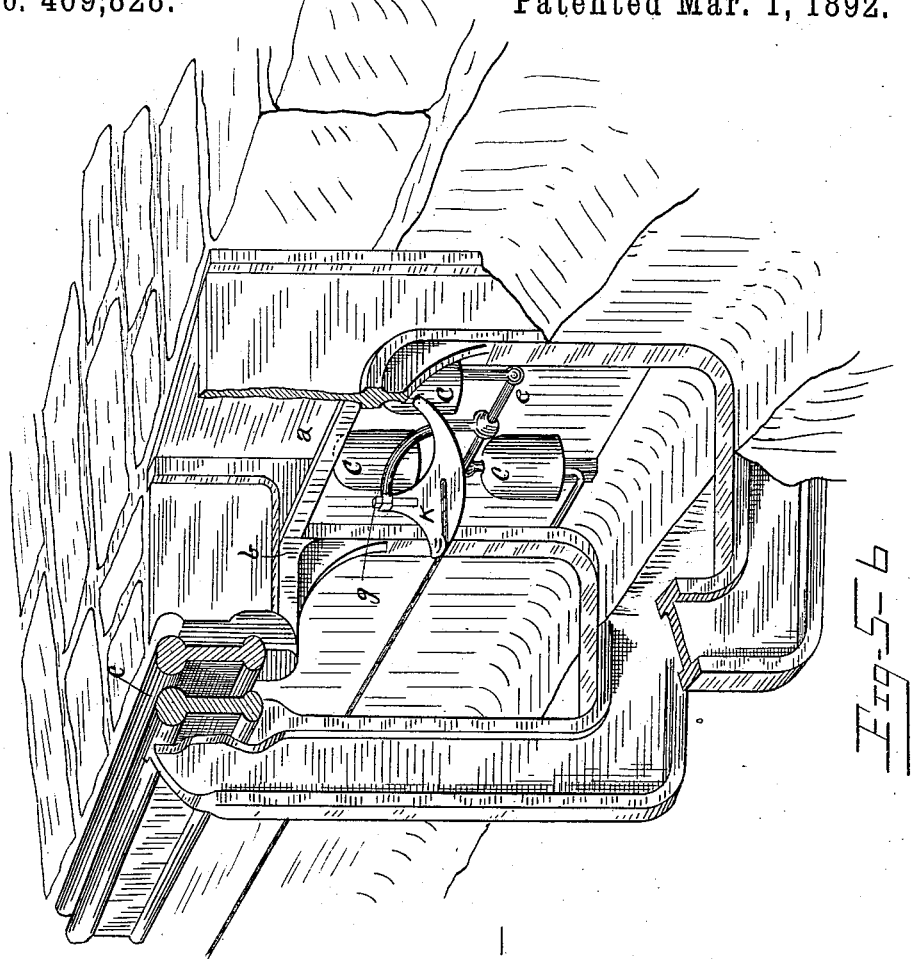
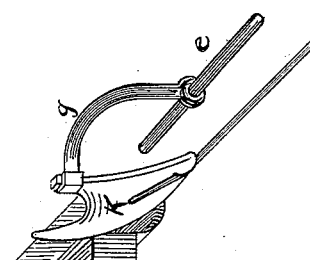
WITNESSES:
Louis J. Thomason
Chas. J. Stockman
INVENTORS:
John Edward Waller
Edward Manville
BY Richards & Co.
ATTORNEYS

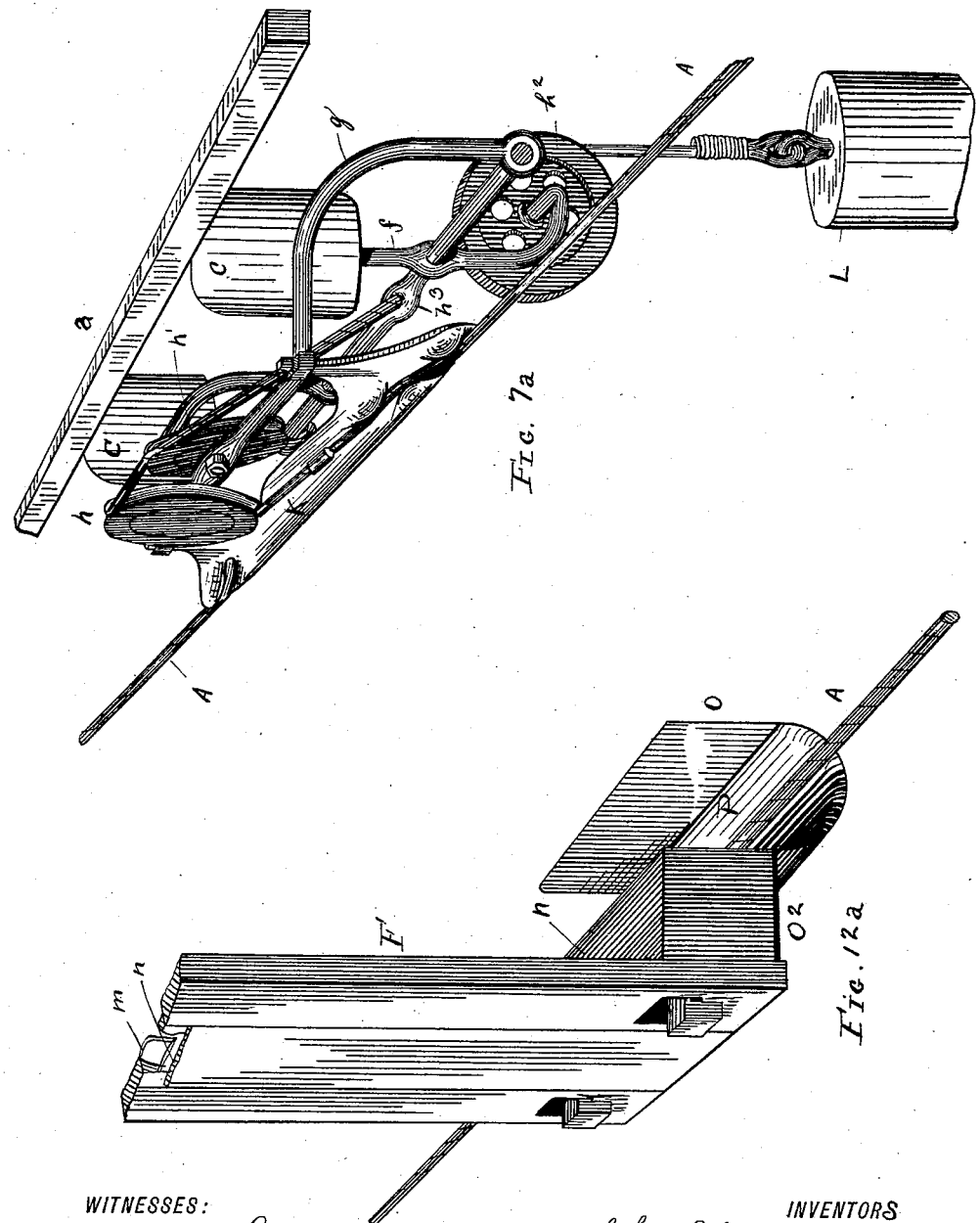

(No Model.) 5 Sheets—Sheet 5.
J. E. WALLER & E. MANVILLE.
CONDUIT SYSTEM FOR ELECTRIC RAILWAYS.
No. 469,828. Patented Mar. 1, 1892.
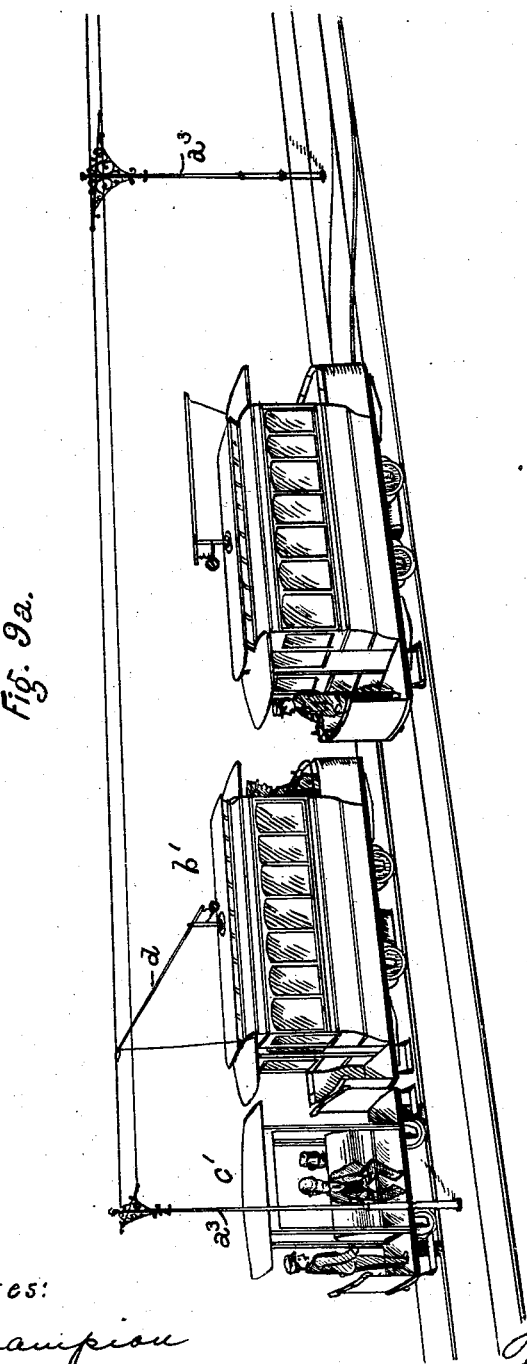

UNITED STATES PATENT OFFICE.

JOHN EDWARD WALLER AND EDWARD MANVILLE, OF LONDON, ENGLAND.

CONDUIT SYSTEM FOR ELECTRIC RAILWAYS.

SPECIFICATION forming part of Letters Patent No. 469,828, dated March 1, 1892.

Application filed May 13, 1890. Serial No. 351,699. (No model.)

*To all whom it may concern:*

Be it known that we, JOHN EDWARD WALLER and EDWARD MANVILLE, subjects of the Queen of Great Britain and Ireland, residing at London, England, have invented Improvements in the Means of and Apparatus for Distributing and Collecting Electricity for the Propulsion of Vehicles, of which the following is a specification.

Our invention relates to those systems of electrical traction in which the car or cars collect the currents by rubbing or rolling contact from a conductor or conductors laid the whole length of the line, and has for its object the providing of means and the construction of apparatus whereby for an underground-conduit system of electrical traction advantages in cheapness and simplicity of construction and after maintenance and repairs more perfect insulation and constant regularity of electrical contact are obtained.

Our invention may be applied where only one conductor is laid from the generating-station, the rail being used as a return, or where two conductors of opposite potential are used, or where two conductors are used for the purpose of dividing the line into sections, so as to connect the locomotors in series circuit, the invention having reference particularly to the mechanical details, as hereinafter described, and being applicable to any known method of distributing electricity from a central station for the purpose of vehicular propulsion.

Our invention consists of a system of apparatus for the distribution and collection of electricity for the propulsion of vehicles, and comprises improvements in the following matters: first, in a means for supporting the conductors; second, in means for rendering such supports flexible or movable; third, in means for insulating such supports from the post-frame or other device connecting them to earth; fourth, in apparatus to admit of suitable tension being kept on the conductors without interference with the passage of a brush or other under collecting device carrying the weight of the suspended conductor; fifth, in methods of obtaining a ready access to the conductors, insulators, supports, and other apparatus when they are laid in a conduit or tube beneath the surface of the ground and for giving facility for the laying, removal, or renewal of such conductors, insulators, supports, or other apparatus; sixth, in forms of brushes or other collecting devices, more especially as applied to tramways or other railways, where the current is collected from a conductor or conductors laid below the level of the rails or vehicles—as, for instance, in a conduit or tube beneath the road-surface; seventh, in devices for enabling the brushes or collectors being automatically guided into one or other branch of the conductor or to cross another conductor—as, for instance, at the points or crossings of railway or tramway junctions or sidings; eighth, in a method of facilitating the junction of a conduit system with a system where overhead conductors are employed by means of an independent or dummy collecting-car traveling on the main rails and capable of carrying passengers or goods.

We will now proceed to describe in detail the various parts of our invention, and in order that we may more readily be understood we will describe our invention as applied to a street-tramway, where the conductor is laid in a conduit or tube beneath the level of the street and where the current is conveyed from a conductor to the motors on the tram-cars or vehicles by means of a collecting arm or arms propelled by the vehicle and passing through a narrow slot or opening in the road-surface, giving access to the conductor throughout the entire length of the conduit or tube.

In order to make ourselves better understood, we will describe the various parts of our invention in relation to the drawings hereunto annexed, reference being had to the letters marked thereon.

Like letters refer to like parts in the various figures.

The conduit may be situated beneath one of the ordinary tramway-rails or between such rails or under the roadway outside the rails.

Although we describe our invention in connection with underground conductors, we desire it to be particularly understood that many of the details are equally applicable to an overhead-conductor system.

Figure 1 is a sectional view of the roadway, showing the conduit and supports in elevation and the collector and conductor in sectional elevation. Fig. 2 is a side elevation of the conduit. Fig. 3 is a sectional view of the conduit and collector provided with two sets of conductors, supports, and collecting devices. Fig. 4 shows a form of rigid support for use around curves and similar purposes. Fig. 5 is a side view of the same. Fig. $5^a$ shows a perspective view of the same including an anchorage attachment at the end of a section of conductor. Fig. $5^b$ is a perspective view of a similar anchorage attachment with triple insulator-support. Figs. 6 and 7 show two views of the tension device for maintaining a proper tension upon the flexible conductor. Fig. $7^a$ is a perspective view of the same. Fig. 8 is an enlarged plan of the collector. Fig. 9 is a view of a dummy-car and tramway-car connected together upon a section of line where underground and overhead systems meet. Fig. $9^a$ is a perspective view of the same. Fig. 10 shows a plan of the arrangement of rails, conduits, and overhead conductors at such a junction. Fig. 11 is a sectional view of Fig. 8. Fig 12 is a side view of the collectors, showing the disposition of the collecting-surfaces. Fig. $12^a$ is a perspective view of the same. Fig. 13 is a plan of a siding or turn-out, showing the arrangement of the anchorages of the conductors and the electrical connections for the same to allow of the passage of the collector to one or other branch of the line.

We carry out our invention by using a flexible conductor A, resting upon suitable supports, hereinafter more fully described, in a conduit B, from which the current can be collected in a similar manner as it is collected when overhead conductors are used. The flexible conductor may be of a section sufficiently small to allow of its being taken out and put into the tube or conduit through the slot C in the roadway. We form openings in the conduit at intervals generally coinciding with the lengths of the slot-rail, such openings being roofed by the movable cover E, as shown in Fig. 1. In these openings and beneath the bottom of the cover we place an insulator or separator, preferably an oil-insulator, attached to the side or frame-work in such a manner as will allow of its being easily removed or renewed. To this insulator we connect the support to the conductor.

When the line of tramway to which our invention is applied is straight, the insulator may be attached to the bar $a$, resting in recesses $b$ in the yokes or chairs supporting the slot-rails. Upon this bar $a$ the insulator $c$ is mounted, carrying a suitably-shaped arm D, projecting into the tube, on which the conductor rests but is not attached thereto, or through which the conductor is threaded or to which it is attached.

The collecting device F, as hereinafter more fully described, is propelled by the tram-car or vehicle, and is set at such a level as to enable it to pass over the supporting-arm D while lifting the conductor. After the passage of the collector the conductor again drops onto and is supported by the arm D, or after being lifted together with the arm drops to its original position.

At convenient intervals we have found it necessary to anchor the conductor. For this purpose we generally use the device as shown in Figs. 4 and 5, in which we place two insulators $c\,c$ close together and parallel to the center line of the conduit. A cross-bar $e$ is supported below and between these insulators upon suitable supports $f$, mounted in the insulators. On the cross-bar $e$ is hinged a movable arm $g$, arched in such a manner as to permit of the conductor being secured to its other extremity without its coming in the way of the passage of the collector.

Where it is necessary to arrange the anchoring device so as to be capable of resisting the strain placed upon the cross-bar to a greater extent, we use either in addition to or as substitutes for the insulators, as hereinbefore described, side insulators, so as to be more directly in the line of strain and thus capable of resisting the strain upon the cross-bar to a greater extent, as illustrated at $c$ in Fig. $5^b$. This arrangement serves to retain the conductor at its normal level—viz., A', as shown in dotted lines, Fig. 4—except during the passage of the collector, when it can be lifted in a radial direction by the same. The height of the conductor at the lowest point in the sag is shown at $A^2$ in Fig. 1. The arm $g$, being free to swivel in the cross-bar $e$ of the before-described anchoring device and having only a lifting movement, keeps a constant strain on the conductor. This or a similar arrangement we use to retain the conductor fairly centrally in the tube when the conduit is curved to suit the direction of the tramway. In some cases when supporting the conductor round curves we do not necessarily rigidly attach the conductor to the lifting-arm $g$, but allow the conductor free movement in the direction of its length, but prevent any lateral movement by means of the arm $g$.

Where it is necessary to provide an anchorage for the conductor, so that the conductor between its supports may be retained to a constant length, notwithstanding any extention or contraction due to change of temperature or otherwise, we use the following arrangement: Instead of rigidly attaching the conductor to the lifting-arm $g$, as shown in Figs. 4 and 5, we carry it round sheaves or pulleys $h$ and $h'$, as shown in Figs. 6, 7, and $7^a$, arranged on the arm $e$, and thence through an eye $h^3$ in the axis of the said arm and over another pulley $h^2$, so situated that when the arm is in its lower or normal position the conductor shall lie in a straight line between the pulleys $h'$ and $h^2$. We then attach a weight L or an insulated spring to the conductor, so as to maintain a constant strain thereon. It is obvious from the disposition of the pulleys and the eye $h^3$ on the bar $e$ that the passage of the collector in lifting the conductor does not alter the height of the weight L or the tension on the spring, as the conductor passing through the axis of rotation is radial thereto, and consequently the radial movement of the arm merely bends the conductor to a slight extent at the axis without altering its length between the pulleys. For each conductor we generally use two collectors F, situated at a convenient distance apart, partly in order to prevent any risk of sparking owing to the collector making bad contact from any unevenness in travel and partly to facilitate the passage of the collector onto a branch conductor—as, for instance, at a turn-out or siding. In this case we anchor the cable in two places by means of any of the before-described anchoring devices, leaving a gap between such points of anchorage, as shown in Fig. 13—viz., from S to T or from S to T', of a less length than the distance between the two parts of the collector F, attached to the tramway-car, as shown in Fig. 12, the electrical continuity of the circuit being maintained by means of an independent conductor $t$, laid in any convenient position, not necessarily in the conduit itself, but so as not to come in contact with the passing collector. The stalk or fastening-pieces attaching the conductor to the anchoring arm or arms $g$ is shaped so as to facilitate the conductor making contact when passing the gap, as shown in Fig. 7 and in Figs. $5^a$ and $5^b$. A similar arrangement can be used when conductors of opposite potentiality have to cross each other. The collecting-arm we make in the form of a shank, which is attached to the tram-car or dummy-car, as the case may be, in any convenient manner, and is made of such a thickness as to easily pass through the slot in the road. The center of this shank we make hollow and lay a conductor $m$ therein. This conductor is insulated by insulating-strips $n$ from the side plates of the collector, which may be made of iron or steel. The collector itself is a U, V, or other conveniently shaped plate O, having, preferably, a renewable wearing-piece of soft metal P or other equivalent conducting material, so as to cause as little wear of the conductor as possible. This collector is attached by screws or other equivalent fastening arrangement to a separator or insulator $r$ of non-conductive material. The attachment we make between the separator and the shank is preferably of the form shown in the various sections of the shank in Figs. 8, 11, 12, and $12^a$—viz., that of a hook or dog-nose $p$, firmly fixed in the separator $r$ upon the collector, passing through a slot in the shank, and dropping down until the hooked end engages behind the other side of the shank. The object of this is that the collector may be detached from the shank and removed through one of the hatchways or openings in the road, and the shank can then be drawn up through the slot and removed. The electrical connection is made between the insulated conductor $m$ in the shank and the collector O by means of a spring $o'$ and plate $o^2$, so that electrical connection is made automatically when the collector is hooked onto the shank.

When our system is applied to a system of tramways so situated that overhead conductors may be used on a portion of the route, but are inadmissible throughout its entire length—as, for instance, where a tramway is partly in a town and partly on a suburban road—we make the following provisions: Instead of carrying the collectors upon the tram-car proper we carry them upon an independent truck, which may, if desired, be provided with seats for passengers, Fig. $9^a$. The main tram-car is similar in design to that ordinarily used with overhead conductors, being supplied with motors and collecting-arms. When the car is traveling on the conduit portion of the road, as shown in Figs. 9 and 10, the truck is coupled thereto, both mechanically and electrically, by any of the well-known coupling devices, and on reaching the commencement of the overhead system the truck is uncoupled and the collecting-arm on the tram-car brought into contact with the overhead conductor. The truck is then available for attachment to a return car passing from the overhead-line section to the conduit-section.

As shown in Figs. 9 and 10, it will be seen that the overhead conductor terminates at $a^3$ and the underground conductor terminates at $a^4$, so that the two systems overlap one another for the distance of $a^3$ to $a^4$. Supposing that a tram-car $b'$ and dummy-car $c'$ upon reaching the junction of the two systems are disconnected both mechanically and electrically, the tram-car $b'$ can continue its journey upon the section of the line having the overhead conductors by making contact therewith through the collecting-arm $d$. The dummy-car $c'$ can then be removed to the down line and attached to another tram-car returning along the underground-conductor section. By these means our system can be carried out in connection with any existing overhead system without in any way necessitating the alteration of the existing rolling-stock and plant.

Having fully described our invention, what we claim, and desire to secure by Letters Patent, is—

1. A system of distribution and collection of electric current for the propulsion of vehicles, consisting of a flexible conductor supported upon but not rigidly attached to insulators situated widely apart, a rigid collector arm or arms detachably attached to a shank carried by the tram or by a dummy car, the said collector acting on the under side of the conductor and being short enough to lift the conductor free from or with its insulated supports to insure uniform and effective electrical contact upon the collector by the weight of the conductor, and a straining device capable of moving the conductor longitudinally and consisting of a hanging weight and connecting-yoke to the next section, permitting passage of underneath collector and maintaining continuous electrical contact between collector and conductor without considerable, if any, pressure from a straining weight upon the collector, substantially as described.

2. A device for maintaining at a junction the electrical continuity of the conductor and its vertical flexibility with under rubbing collectors, while mechanical continuity is broken to permit the alternative passage of the shanks of the said collectors, consisting of the combination of two under rubbing collectors effecting contact by the lifted weight of the conductor and spaced wider apart than the width of the mechanical gaps in the said conductors, a swiveling anchorage or tension-straining yoke at the end of each section of conductor approaching the junction, permitting the easy entrance of the collector, and an auxiliary sagging conductor between the ends of the main conductors, substantially as described.

3. In combination with a flexible conductor, in an underground conduit, and with a car carrying an electrical motor and driving appliance, a dummy or independent car traveling on the main bearing-rails and capable of carrying passengers or attendants in a suitable upper car-body, carrying a shank containing an insulated conductor and arms entering the slot in the roadway, and having detachably-attached collecting-arms, the dummy-car and tram-car being electrically and mechanically coupled together to permit the current collected by the dummy-car being transmitted to the motor on the tram-car.

4. In combination with an underground conduit, a flexible conductor and an automatic longitudinal straining device for sustaining the said conductor from the ground between insulators at wide intervals, said device consisting of a hanging weight, pulley, and connecting stalk or yoke allowing the under collector to pass, substantially as and for the purpose specified.

5. In the conductor straining device, the rocking arm $e$, adapted to turn on an axis parallel to the conductor, permitting the collector to lift the conductor as it passes, pulleys $h$ $h'$, and orifice $h^3$ in said arm, through which the conductor passes from the said pulleys to the hanging weight L, substantially as and for the purposes set forth.

6. In combination with an underground conduit, the conductor-supporting devices consisting of a spoon-shaped arm for the straight road and a pivoted arm with an eye for curves, permitting the lifting of the conductor and the free passage of the collector, the said supports being mounted on insulators attached to a bar supported in the rail-chairs and readily removable through a hatchway formed in the street or road.

7. In combination with a flexible conductor, in a conduit, a collecting arm and shank detachably secured to one another by suitable attachments P, said attachments engaging through slots in one of said parts and adapted to be disengaged at will, substantially as set forth.

In testimony whereof we have signed our names to this specification in the presence of two subscribing witnesses.

JOHN EDWARD WALLER.
EDWARD MANVILLE.

Witnesses:
RICHARD A. HOFFMANN,
C. H. CARTER.